(12) United States Patent
Lee et al.

(10) Patent No.: US 10,609,728 B2
(45) Date of Patent: *Mar. 31, 2020

(54) METHOD FOR PERFORMING AN ACK/NACK INDICATION BASED ON THE UPLINK GRANTS OVER MULTIPLE SUBFRAMES IN A WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 40 days.

This patent is subject to a terminal disclaimer.

(21) Appl. No.: 15/567,588

(22) PCT Filed: May 18, 2016

(86) PCT No.: PCT/KR2016/005240
§ 371 (c)(1),
(2) Date: Oct. 18, 2017

(87) PCT Pub. No.: WO2016/190592
PCT Pub. Date: Dec. 1, 2016

(65) Prior Publication Data
US 2018/0294940 A1  Oct. 11, 2018

Related U.S. Application Data

(60) Provisional application No. 62/165,213, filed on May 22, 2015, provisional application No. 62/172,820, filed on Jun. 9, 2015.

(51) Int. Cl.
*H04W 72/14* (2009.01)
*H04L 1/18* (2006.01)
(Continued)

(52) U.S. Cl.
CPC ............... *H04W 72/14* (2013.01); *H04L 1/18* (2013.01); *H04L 1/1848* (2013.01);
(Continued)

(58) Field of Classification Search
CPC . H04W 72/14; H04W 72/0446; H04W 76/27; H04W 72/0413; H04W 72/1284;
(Continued)

(56) References Cited

U.S. PATENT DOCUMENTS

| 2003/0159099 A1 | 8/2003 | Vukovic et al. |
| 2007/0047451 A1 | 3/2007 | Lohr et al. |

(Continued)

FOREIGN PATENT DOCUMENTS

| EP | 2161960 | 3/2010 |
| EP | 2557882 | 2/2013 |

(Continued)

OTHER PUBLICATIONS

PCT International Application No. PCT/KR2016/005240, Notification of Transmittal of the International Search Report and the Written Opinion of the International Searching Authority, or Declaration dated Aug. 24, 2016, 9 pages.
(Continued)

*Primary Examiner* — Khaled M Kassim
(74) *Attorney, Agent, or Firm* — Lee Hong Degerman Kang & Waimey

(57) ABSTRACT

The present invention relates to a wireless communication system. More specifically, the present invention relates to a method and a device for performing an ACK/NACK indication based on the uplink grants over multiple subframes in
(Continued)

a wireless communication system, the method comprising: starting a timer when an uplink grant is received from an eNB, wherein the uplink grant is valid while the timer is running; transmitting data using the uplink grant if the data is generated while the timer is running; monitoring an ACK indication or an or a NACK indication for the transmitted data on a subframe; checking whether the timer is running or not if the ACK indication for the transmitted data is not received on the subframe; and retransmitting the data using the uplink grant if the timer is running.

8 Claims, 15 Drawing Sheets

(51) Int. Cl.
  *H04W 28/10*   (2009.01)
  *H04W 28/02*   (2009.01)
  *H04W 72/12*   (2009.01)
  *H04W 76/27*   (2018.01)
  *H04W 72/04*   (2009.01)
  *H04L 5/00*   (2006.01)

(52) U.S. Cl.
  CPC .......... *H04L 1/1887* (2013.01); *H04L 5/0055* (2013.01); *H04W 28/0278* (2013.01); *H04W 28/10* (2013.01); *H04W 72/0413* (2013.01); *H04W 72/0446* (2013.01); *H04W 72/1268* (2013.01); *H04W 72/1284* (2013.01); *H04W 76/27* (2018.02); *H04W 72/042* (2013.01)

(58) Field of Classification Search
  CPC .......... H04W 72/1268; H04W 28/0278; H04L 5/0055; H04L 1/18
  See application file for complete search history.

(56) References Cited

U.S. PATENT DOCUMENTS

| | | |
|---|---|---|
| 2007/0133582 A1 | 6/2007 | Banerjee et al. |
| 2008/0137618 A1 | 6/2008 | Sung et al. |
| 2009/0046605 A1 | 2/2009 | Gao et al. |
| 2009/0175232 A1 | 7/2009 | Kolding |
| 2009/0176494 A1* | 7/2009 | Lee ................ H04W 36/0055 455/436 |
| 2010/0035581 A1* | 2/2010 | Park ................ H04W 74/08 455/412.1 |
| 2010/0070814 A1* | 3/2010 | Damnjanovic ......... H04L 1/188 714/748 |
| 2010/0202420 A1 | 8/2010 | Jersenius et al. |
| 2010/0232331 A1* | 9/2010 | Son ................ H04L 1/188 370/311 |
| 2010/0284314 A1 | 11/2010 | Pelletier et al. |
| 2010/0290415 A1 | 11/2010 | Han et al. |
| 2011/0026625 A1* | 2/2011 | Susitaival ......... H04W 52/0251 375/260 |
| 2011/0055387 A1 | 3/2011 | Tseng et al. |
| 2011/0205975 A1 | 8/2011 | Umesh et al. |
| 2011/0243014 A1 | 10/2011 | Lee et al. |
| 2011/0310997 A1* | 12/2011 | Ke ................ H04W 76/28 375/316 |
| 2012/0263095 A1* | 10/2012 | Quan ................ H04W 52/0216 370/312 |
| 2012/0294270 A1* | 11/2012 | Yamada ................ H04W 74/02 370/329 |
| 2012/0300744 A1 | 11/2012 | Larmo et al. |
| 2013/0010738 A1 | 1/2013 | Marchand et al. |
| 2013/0044699 A1 | 2/2013 | Eriksson |
| 2013/0114445 A1 | 5/2013 | Wen et al. |
| 2013/0163543 A1 | 6/2013 | Freda et al. |
| 2013/0265866 A1* | 10/2013 | Yi ................ H04W 74/0841 370/216 |
| 2013/0301579 A1 | 11/2013 | Zhang et al. |
| 2013/0322413 A1* | 12/2013 | Pelletier ............ H04W 72/1289 370/336 |
| 2014/0016593 A1 | 1/2014 | Park et al. |
| 2014/0051415 A1 | 2/2014 | Ekici et al. |
| 2014/0056198 A1* | 2/2014 | Quan ................ H04W 52/0216 370/311 |
| 2014/0133447 A1 | 5/2014 | Moulsley et al. |
| 2014/0219215 A1 | 8/2014 | Brucknell et al. |
| 2014/0314055 A1 | 10/2014 | Lee et al. |
| 2014/0321391 A1 | 10/2014 | Zhang et al. |
| 2014/0341173 A1 | 11/2014 | Wu |
| 2015/0009872 A1* | 1/2015 | Yang ........................ H04J 3/00 370/280 |
| 2015/0043352 A1 | 2/2015 | Jang et al. |
| 2015/0078286 A1 | 3/2015 | Kim et al. |
| 2015/0092542 A1* | 4/2015 | Yang ................ H04W 28/0268 370/230 |
| 2015/0117342 A1* | 4/2015 | Loehr ............... H04W 72/1284 370/329 |
| 2015/0139080 A1 | 5/2015 | Ellenbeck et al. |
| 2015/0341938 A1* | 11/2015 | Tawashi ............ H04W 72/0486 370/329 |
| 2016/0105878 A1* | 4/2016 | Zhao ..................... H04L 1/1887 370/329 |
| 2016/0156422 A1 | 6/2016 | Lindoff et al. |
| 2016/0192396 A1* | 6/2016 | Ng .................... H04W 74/0808 370/329 |
| 2016/0205679 A1* | 7/2016 | Yoo ...................... H04L 1/0026 370/329 |
| 2016/0205703 A1 | 7/2016 | Dudda et al. |
| 2016/0338097 A1* | 11/2016 | Andreoli-Fang .......................... H04W 72/1284 |
| 2017/0238314 A1 | 8/2017 | Zhang et al. |
| 2018/0027448 A1 | 1/2018 | Lindoff et al. |
| 2018/0097599 A1* | 4/2018 | Lee ........................ H04W 24/02 |
| 2018/0115983 A1 | 4/2018 | Harada et al. |
| 2018/0145795 A1* | 5/2018 | Yi .......................... H04W 28/04 |
| 2018/0227941 A1 | 8/2018 | Zhang et al. |
| 2018/0279324 A1* | 9/2018 | Wang .................... H04L 5/0055 |
| 2018/0279375 A1* | 9/2018 | Jeon ................. H04W 74/0833 |

FOREIGN PATENT DOCUMENTS

| | | |
|---|---|---|
| WO | 2014096765 | 6/2014 |
| WO | 2014098700 | 6/2014 |

OTHER PUBLICATIONS

PCT International Application No. PCT/KR2016/005239, Notification of Transmittal of the International Search Report and the Written Opinion of the International Searching Authority, or Declaration dated Aug. 19, 2016, 10 pages.
PCT International Application No. PCT/KR2016/005241, Notification of Transmittal of the International Search Report and the Written Opinion of the International Searching Authority, or Declaration dated Aug. 26, 2016, 11 pages.
Nokia, "Latency Reduction Rel-10 discussion recaps", 3GPP TSG RAN WG2 Meeting #90, R2-152301, May 2015, 3 pages.
MEDIATEK, "UL Contention Based Access for Latency Reduction", 3GPP TSG RAN WG2 Meeting #90, R2-152383, May 2015, 6 pages.
ZTE, "Guidelines for Latency Reduction Enhancement in RRC_Connected Mode", 3GPP TSG RAN WG2 Meeting #90 R2-152420, May 2015, 3 pages.
Samsung, "UL grant patterns for TTI bundling", 3GPP TSG RAN WG2 Meeting #83, R2-133252, Oct. 2013, 3 pages.
Ericsson, "Motivation for new SI: Study on Latency reduction techniques for LTE", 3GPP TSG RAN Meeting #67, RP-150310, Mar. 2015, 16 pages.
United States Patent and Trademark Office U.S. Appl. No. 15/573,814, Office Action dated Oct. 18, 2018, 29 pages.
European Patent Office Application Serial No. 168002335, Search Report dated Oct. 18, 2018, 8 pages.

(56) References Cited

OTHER PUBLICATIONS

European Patent Office Application Serial No. 16800231.9, Search Report dated Dec. 10, 2018, 15 pages.
Alcatel-Lucent, "On the Time Duration Field in the Uplink Scheduling Grant", 3GPP TSG RAN WG1 Meeting #51, R1-074991, Nov. 2007, R1-074991, XP050108440, 7 pages.
LG Electronics, "Dynamic scheduling for latency reduction", 3GPP TSG RAN WG2 NR Ad hoc, R2-1801480, Jan. 2018, XP051386884, 2 pages.
European Patent Office Application Serial No. 16800232.7, Search Report dated Jan. 2, 2019, 24 pages.
Alcatel-Lucent, "Multi-Process Transmission Technique to Improve Uplink Coverage for LTE", 3GPP TSG RAN WG1 Meeting #51bis, R1-080443, Jan. 2008, 10 pages.
European patent application No. 16800232.7, European search report dated Mar. 29, 2019, 29 pages.
Samsung, "DRX operation during UL transmission," 3GPP TSG-RAN2 Meeting #61, R2-080822, Sorrento, Italy, Feb. 11-15, 2008, 4 pages.
Panasonic, "ProSe BSR procedure for D2D communcation," 3GPP TSG RAN WG2 Meeting #87bis, R2-144382, Shanghai, China, Oct. 6-10, 2014, 4 pages.
Ericsson, "Correction on Ue behavior for DRX for Regular BSR," 3GPP TSG-RAN2 #62, R2-083151, Warsaw, Poland, Jun. 30-Jul. 4, 4 pages.
United States Patent and Trademark Office U.S. Appl. No. 15/574,472, Office Action dated Jan. 30, 2019, 18 pages.
United States Patent and Trademark Office U.S. Appl. No. 15/573,814, Office Action dated May 15, 2019, 18 pages.
European patent application No. 16800233.5, European search report dated Sep. 6, 2019, 7 pages.
United States Patent and Trademark Office U.S. Appl. No. 15/573,814, Office Action dated Oct. 2, 2019, 17 pages.

\* cited by examiner

FIG. 3
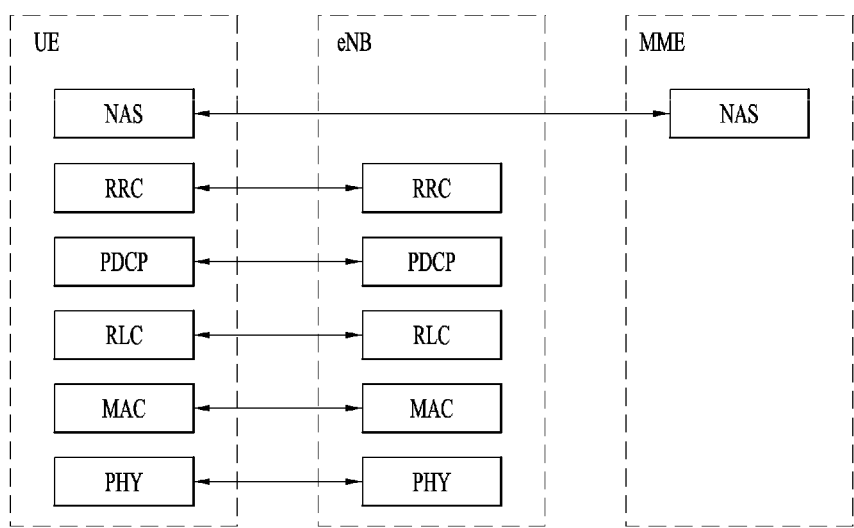
(a) Control-Plane Protocol Stack
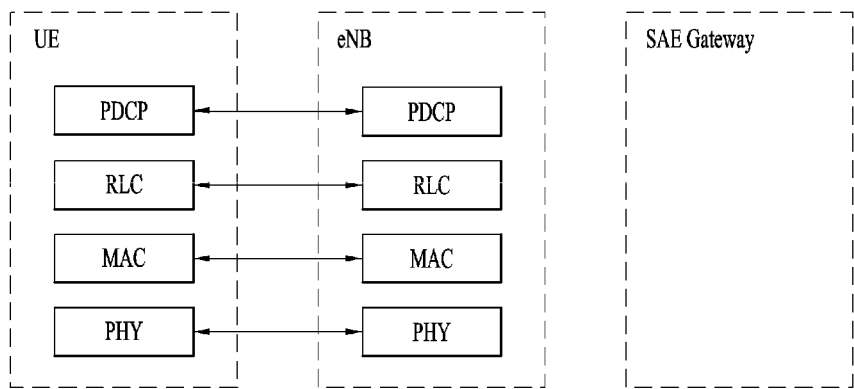
(b) User-Plane Protocol Stack

METHOD FOR PERFORMING AN ACK/NACK INDICATION BASED ON THE UPLINK GRANTS OVER MULTIPLE SUBFRAMES IN A WIRELESS COMMUNICATION SYSTEM AND A DEVICE THEREFOR

CROSS-REFERENCE TO RELATED APPLICATIONS

This application is the National Stage filing under qj35 U.S.C. 371 of International Application No. PCT/KR2016/005240, filed on May 18, 2016, which claims the benefit of U.S. Provisional Application Nos. 62/165,213, filed on May 22, 2015 and 62/172,820, filed on Jun. 9, 2015, the contents of which are all hereby incorporated by reference herein in their entirety.

TECHNICAL FIELD

The present invention relates to a wireless communication system and, more particularly, to a method for performing an ACK/NACK indication based on the uplink grants over multiple subframes in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing an ACK/NACK indication based on the uplink grants over multiple subframes in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

The intention is to avoid transmitting multiple PDCCHs for multiple UL grants. This can be realized by providing the time period (multiple subframes) during which the UL grant is valid. The benefit would be the reduced signaling overhead especially for the data which could only be roughly predictable when it becomes available for transmission.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
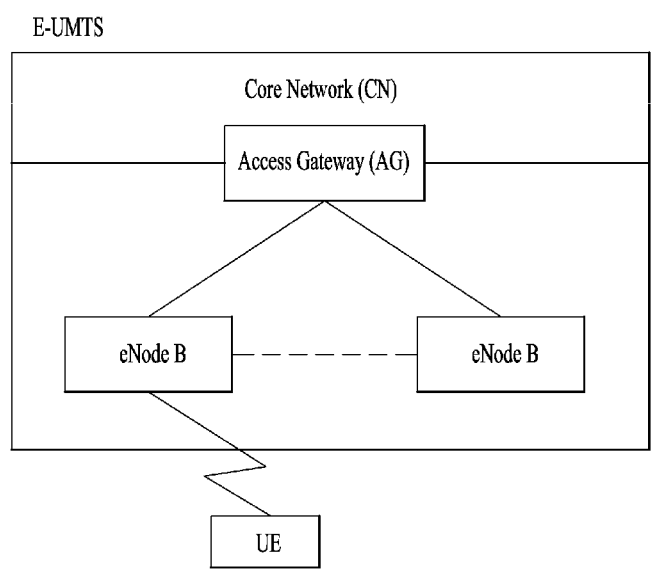
FIG. 1 is a diagram showing a network structure of an Evolved Universal Mobile Telecommunications System (E-UMTS) as an example of a wireless communication system.
Figure 2A:
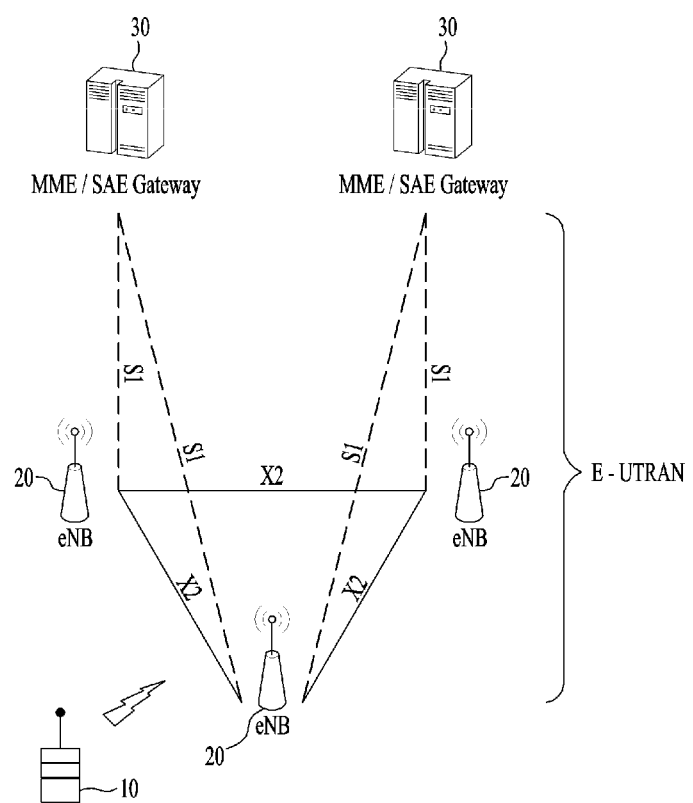
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
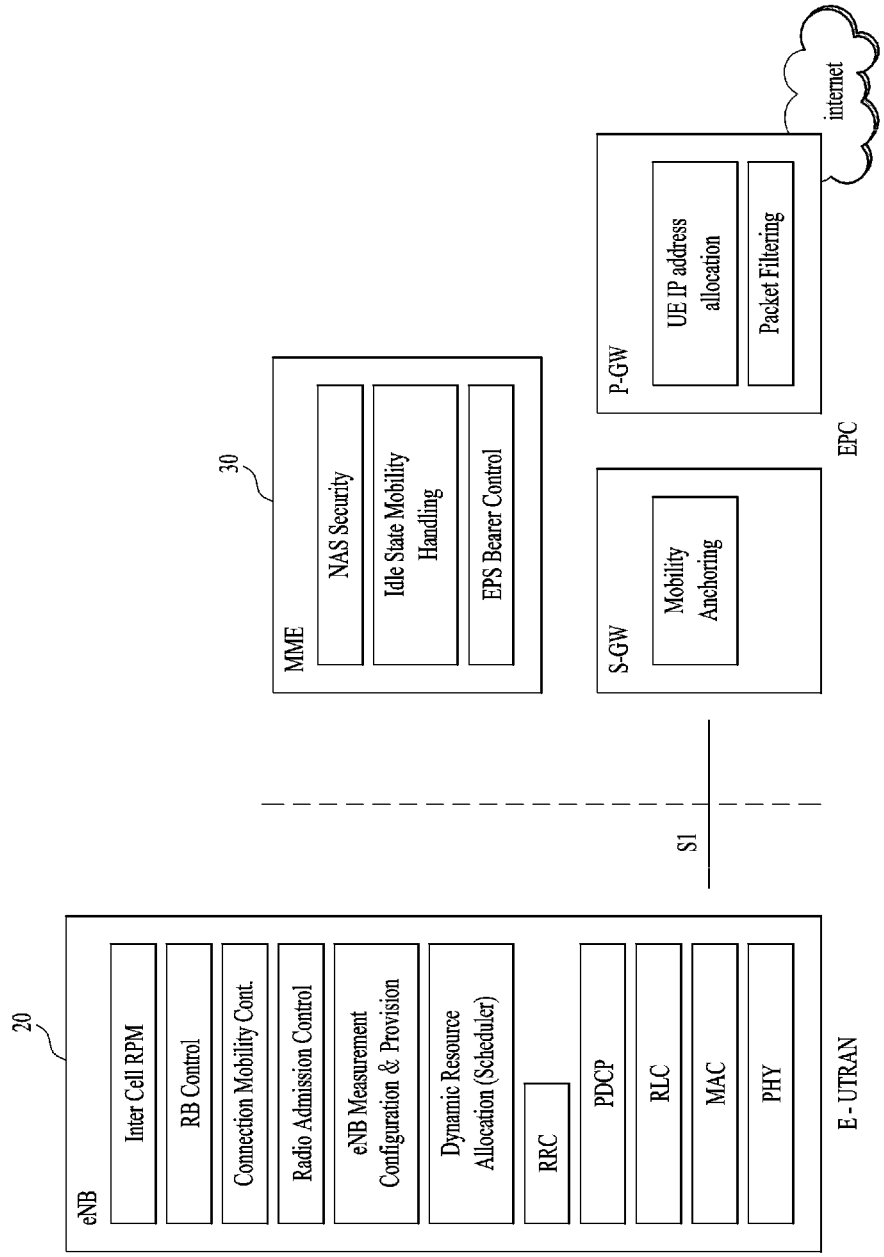
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
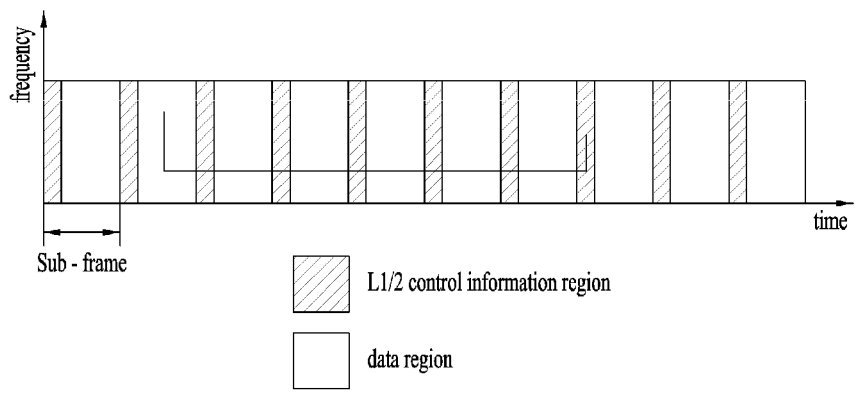
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
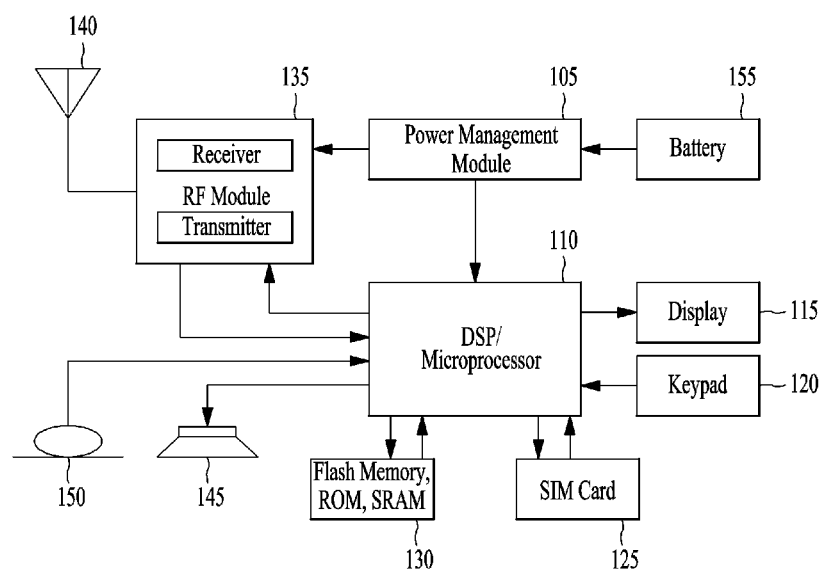
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
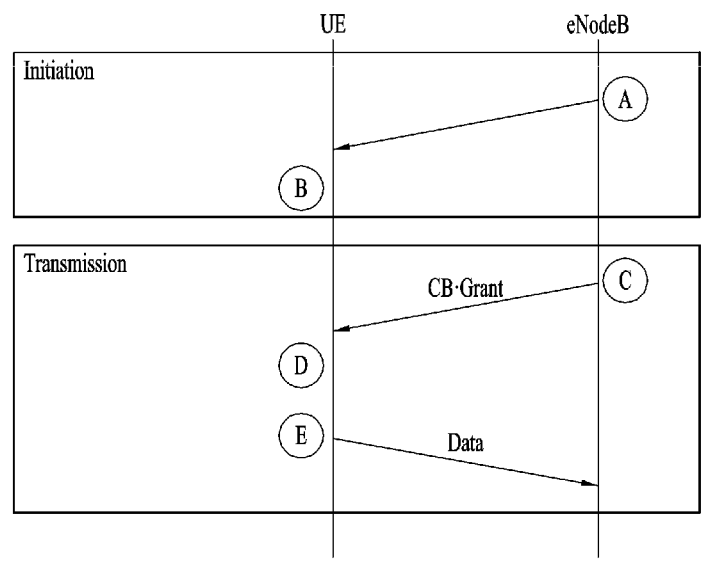
FIG. 6 is an example for a diagram for performing contention based transmission.

FIG. 6 is an example for a diagram for performing contention based transmission.

One simple but efficient method for latency reduction for typical internet traffic in an unloaded or partially-loaded network is Pre-allocation. Pre-allocation is a form of pre-scheduling that provides the UE with an opportunity to send UL packets without requiring the UE to send a scheduling request. The scheduling request procedure when in-sync takes 10 ms, and this makes it impossible for LTE to support the original RAN latency requirement of 10 ms round trip (2× 5 ms one way) delay defined in the original LTE requirement specification 25.913 unless UL resources are pre-scheduled for the terminal.

Pre-allocation provides resource block grants to UEs in case they have something to transmit when those resource blocks are not used for actual traffic from other UEs. One possibility for the network is to trigger such pre-allocation of UL resources using downlink packets that are likely to require some acknowledgement from the UE (e.g. a Ping or TCP ACK). More generalized schemes can also be considered.

Note that Pre-allocation is different from other forms of pre-scheduling such as Semi-persistent scheduling. Pre-allocation uses the PDCCH to grant UL resources when not used by actual traffic. On the other hand semi-persistent scheduling provides a regular allocation to the UE without repetitive scheduling on the PDCCH.

Meanwhile, the goal with Contention Based (CB) transmission is to allow uplink synchronized UEs to transmit uplink data without sending Scheduling Request in advance. That would reduce both the latency and the signaling overhead. For small data packets, there could be a tradeoff point where a small packet is more efficiently transmitted on a CB channel, compared to a scheduled one.

A general property of CB channels is that the error rate increases, since data packets may collide with each other. Collisions reduce the maximum throughput of the channel and the throughput becomes sensitive to the offered load. If the offered load is allowed to increase beyond the channel capacity, the collision probability increases rapidly, the system becomes unstable and the throughput decreases. It is therefore of prime importance that CB transmissions do not interfere with Contention Free (CF) uplink transmissions, and that the eNB has effective and fast means of allocating the resources for CB transmission.

One way to achieve the above is to allow CB transmission only in uplink Resource Blocks that have not been reserved for CF uplink transmission. Dynamic assignment of uplink Resource Blocks for CB transmission can be achieved by using the Downlink Physical Control CHannel (PDCCH). By using the PDCCH, CB grants can be assigned to unused resources on a per subframe basis, so that scheduling of uplink CF transmissions is not affected. In this way, a static assignment of CB resources can be avoided, and CB resources can be dynamically assigned, depending on the uplink load.

Contention Based Radio Network Temporary Identifiers (CB-RNTI) are introduced to identify the CB uplink grants on the PDCCH. The CB uplink grants could have the same format as for Rel-8 UEs, i.e. specify Resource Blocks, Modulation and Coding Scheme and Transport Format to be used for the uplink CB transmission. Rel-10 UEs may listen for CB uplink grants addressed to these CB-RNTIs in addition to grants addressed to their dedicated C-RNTI. The available CB-RNTIs in a cell could be either broadcasted or signaled to each UE during RRC connection setup. The scheme is backwards compatible, since pre Rel-10 UEs would not decode the grants addressed to CB-RNTIs.

As a common resource is used, a unique UE identifier is needed in the MAC PDU to identify the UE. The C-RNTI MAC Control Element can be added to each MAC PDU transmitted on a CB uplink resource.

A UE should only be allowed to transmit on CB uplink grants if it does not have a dedicated CF grant. The UE should only be allowed to use CB resources for a limited number of subframes, to improve collision resolution. In parallel to the CB transmission, the UE can also transmit a Scheduling Request to request contention free resources. Note however that in order to maintain the single carrier uplink property, these cannot be transmitted in the same subframe.

The contention based transmission scheme could be as shown in FIG. 6.

Regarding FIG. 6, the eNodeB informs UE of available CB-RNTIs either by broadcast or dedicated signaling (A). The UE receives the CB-RNTIs and starts monitoring PDCCH for available CB grant (B). The eNodeB schedules a CB grant on the PDCCH (C), and the UE detects a CB grant and performs L2&L1 processing of the data to be transmitted (D). The UE transmits the data on PUSCH using the CB grant (E).

In the proposed form, the CB transmission is supported only for synchronized UEs. In this form, changes to the current specifications are expected to be small and would mainly affect the MAC and RRC specifications. As presented in section 3, there is a perceivable gain in e.g. TCP performance.

Extending the concept to also cover unsynchronized UEs would require substantial changes to the physical layer specifications. For unsynchronized UEs, the transmissions would not fit within the subframe borders, and there would be a need for guard times to avoid overlapping transmissions. Also some form of preamble would be needed to synchronize the eNB receiver. The gain of extending CB transmission scheme to unsynchronized UEs is expected to be small. The gain for synchronized UEs comes from repetitions of the 6 ms difference. For unsynchronized UEs, this would come only once per transaction, as after this the UE would be synchronized. Therefore, we do not consider CB transmissions from unsynchronized UEs to be a worthwhile solution.

Figure 7:
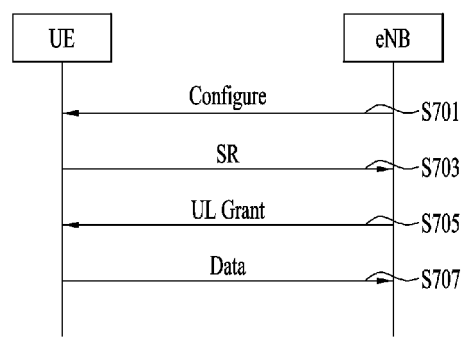
FIG. 7 is an example for a diagram for performing contention based SR procedure.

FIG. 7 is an example for a diagram for performing contention based SR procedure.

In Rel-8, the SR resource and sequence is allocated to a UE via RRC signaling. Of course shorter SR periodicities come at the cost of higher PUCCH resource consumption. The theoretical SR capacity is 18 UEs per PRB, if 180 UEs are supported, the number of PRB equals 180/18=10. If 10 MHz bandwidth is assumed with 1 ms SR period, 20% resource will be used for SR, which is a heavy control channel burden. Hence we propose to consider sharing the SR resource among more than one UE.

FIG. 7 illustrates how SR could be shared. The eNB configures the same SR resource for several UEs through RRC signaling (S701). The UE(s) sends SR to the eNB using the configured SR resource (S703). If there is no collision on SR, the eNB allocates a PUSCH grant (S705). The UE transmits the uplink data on the PUSCH (S707).

Two options can be considered to enable sharing SR.

Option1 is that the UL Grant is addressed to a new SR-RNTI (Shared SR RNTI), configured per group of sharing UEs. Option 2 is that PUCCH Format 1a and/or Format 1b is used for SR. For example, when Format 1a is used, 2 UEs can be identified; with for Format 1b, 4UEs can be identified. After the eNB receives the SR using format 1a and/or 1b, it can allocate a regular UL grant to the identified UE.

We now discuss the handling when more than one UE uses the same PUCCH-SR resource in a TTI (collision).

For option1, the eNB may not be able to tell when a PUCCH-SR collision happens; it grants resources for UL transmission and more than one UE uses it. The PUSCH transmission will fail. The eNB could in this case provide grants to the C-RNTIs of each UE sharing that resource or do nothing. The UE may send SR again if no UL grant is received after sending SR, but needs to apply some (random or UE specific) delay, to avoid continued collision with another UE that would have sent an SR at the same time. The efficiency of such solution depends on the collision probability and degree of robustness of the selected MCS in UL grant: (i.e. if the MCS is quite robust, a first non-colliding transmission is often decoded successfully, so a failed transmission could be assumed caused by a collision.).

For option2, SR collisions likely results in DTX detection at eNB, so no uplink grant is given. The UE behavior can be similar as for option 1. It could be further studied if the eNB can differentiate between receiving a collision or receiving high interference. If the eNB can differentiate, it could allocate UL resource for all the UEs sharing the collided resource separately, which helps to reduce the access delay caused by backoff after collision.

Based on above analysis, it seems option2 provides simpler and more resource efficient SR collision processing mechanism than option1. In addition, no new SR-RNTI is needed in option2.

Both options are inefficient in case PUCCH-SR collision occurs, but again, if SR period is short and few UEs share it, the collision probability remains low.

The sharing PUCCH-SR procedure is compared with CB-PUSCH and we conclude that CB-PUSCH provides best delay performance when the eNB has unused PUSCH resource. When the network is loaded, sharing SR is preferred.

Figure 8:
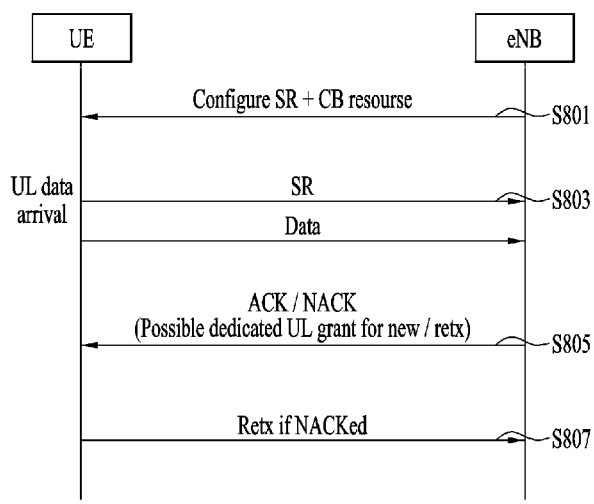
FIG. 8 is an example for a diagram for performing contention based transmission.

FIG. 8 is an example for a diagram for performing contention based transmission.

There might be 3 ms difference between contention based transmission and 1 ms SR period with the assumption of contention based resource is available every TTI, because UE does not need to transmit the dedicated-SR (D-SR) and wait for eNB to response. The same performance could be achieved with dedicated pre-allocation, but it would be very costly to allocate dedicated resources for every UE in every TTI. SR associated contention based transmission offers an interesting compromise, in which the pre-allocated resource is shared and identification of the UEs making use of it is done via the D-SR. The basic procedure of SR associated contention based transmission is shown in FIG. 8.

The eNB configures the UE with D-SR and shared resource (S801). Upon UL data arrival, UE sends SR and the TB on the shared resource "simultaneously" without waiting for dedicated UL grant (S803). The eNB can identify the UEs using the contention based resource based on the received SR. When eNB receives more than one SR linked to same resource, which means collision happens, ACK the TB no matter it is correctly decoded or not and give dedicated grant to each UE sent the SR, i.e. fall back to R8/9; (The ACKed TB would rely on RLC retransmission for collision case). When the eNB only receives one SR linked to the same resource, no collision, NACK if the TB is not correctly decoded, ACK otherwise. Thus from UE perspective, normal R8/9 HARQ is still applicable (S805).

Adaptive retransmission with different resource is possible as UE is identified with the SR which will reduce the load on the contention based resource (S807).

Meanwhile, resource usage efficiency was one of the main concerns raised on contention based transmission on PUSCH because very conservative MCS needs to be used to guarantee the coverage. A contention based resource for a TB of the mostly mentioned typical TCP ACK use case, taking into account RLC header (at least 1~2 bytes)+MAC header with one more byte to be added for UE identity and possible BSR (2~4 bytes), would need 3~4 PRBs (16 bits TBS for one PRB with most conservative MCS); while if dedicated grant with proper MCS (at most 712 bits TBS for one PRB), much less resource is needed to accommodate the TB. If several contention based resources are to be reserved to reduce collision probability, the capacity for dedicated grant would be significantly impacted, which makes the 3 ms latency reduction optimization a rather expensive one.

Furthermore, normal HARQ operation probably cannot work because retransmission from UE upon receiving NACK does not help or even makes the situation worse if the decoding failure is because of collision, and it is difficult (if not impossible) for the eNB to make soft combining of the TB transmitted on the contention based resource; while ACK cannot be interpreted as ACK because it could be an ACK for other UEs. No HARQ makes resource efficiency worse as even more conservative MCS would be required to ensure the TB can be decoded within only one transmission for cell edge UE.

Figure 9:
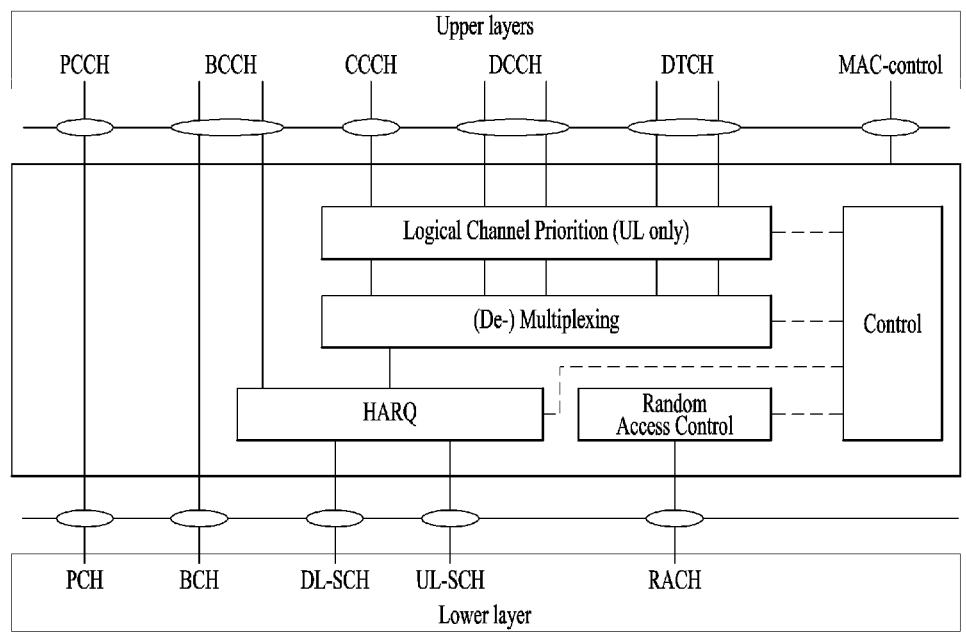
FIG. 9 is a diagram for MAC structure overview in a UE side.

FIG. 9 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical channel types specified for LTE includes Broadcast Control Channel (BCCH), Paging Control Channel (PCCH), Common Control Channel (CCCH), Dedicated Control Channel (DCCH), Multicast Control Channel (MCCH), Dedicated Traffic Channel (DTCH), Multicast Traffic Channel (MTCH).

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report.

The Buffer Status Reporting (BSR) procedure is used to provide a serving eNB with information about the amount of data available for transmission in the UL buffers of the UE. RRC may control BSR reporting by configuring the two timers periodicBSR-Timer and retxBSR-Timer and by, for each logical channel, optionally signalling Logical Channel Group which allocates the logical channel to an LCG (Logical Channel Group).

Figure 10:
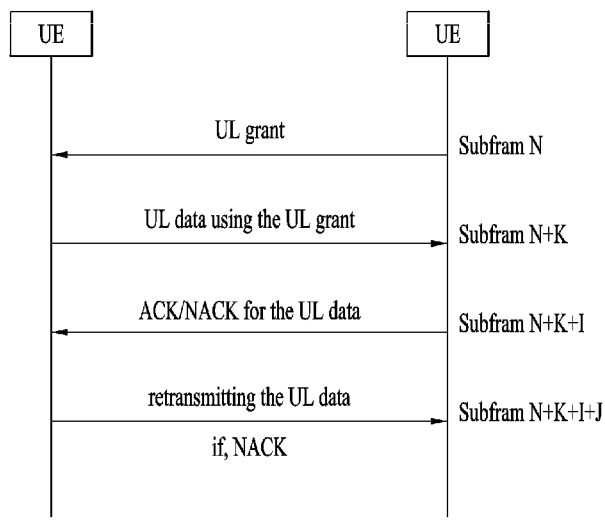
FIG. 10 is a conceptual diagram for uplink grant reception.

For the Buffer Status reporting procedure, the UE may consider all radio bearers which are not suspended and may consider radio bearers which are suspended. A Buffer Status Report (BSR) may be triggered if any of the following events occur: i) arrival of data with higher priority than currently in the transmission buffer—that is, data in a logical-channel group with higher priority than the one currently being transmitted—as this may impact the scheduling decision, (i,e., UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG. FIG. 10 is a conceptual diagram for uplink grant reception.

In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

When the UE receives a valid uplink grant for transmitting uplink data and for a subframe N+K on a subframe N, the UE transmits the uplink data on a subframe N+K using the uplink grant. And then, the UE receives ACK/NACK feedback for transmission of the uplink data on a subframe N+K+I, and if the UE receives NACK indication, the UE should retransmits the UL data on a subframe N+K+I+J.

In detail, if the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI: if an uplink grant for this TTI and this Serving Cell has been received on the PDCCH for the MAC entity's C-RNTI or Temporary C-RNTI; or if an uplink grant for this TTI has been received in a Random Access Response, consider the NDI to have been toggled for the corresponding HARQ process regardless of the value of the NDI if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant, and deliver the uplink grant and the associated HARQ information to the HARQ entity for this TTI.

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

At a given TTI, if an uplink grant is indicated for the TTI, the HARQ entity identifies the HARQ processes for which a transmission should take place. It also routes the received HARQ feedback (ACK/NACK information), MCS and resource, relayed by the physical layer, to the appropriate HARQ processes.

For each TTI, the HARQ entity shall identify the HARQ process(es) associated with this TTI, and for each identified HARQ process, the MAC entity shall obtain the MAC PDU to transmit from the Msg3 buffer if there is a MAC PDU in the Msg3 buffer and the uplink grant was received in a Random Access Response, deliver the MAC PDU and the uplink grant and the HARQ information to the identified HARQ process, and instruct the identified HARQ process to trigger a new transmission, if the uplink grant was received on PDCCH.

Each HARQ process is associated with a HARQ buffer.

Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

The MAC entity is configured with a Maximum number of HARQ transmissions and a Maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall set HARQ_FEEDBACK to the received value.

If the HARQ entity requests a new transmission, the HARQ process shall set CURRENT_TX_NB to 0, set CURRENT_IRV to 0, store the MAC PDU in the associated HARQ buffer, store the uplink grant received from the HARQ entity, set HARQ_FEEDBACK to NACK, and generate a transmission as described below.

If the HARQ entity requests a retransmission, the HARQ process shall increment CURRENT_TX_NB by 1. If the HARQ entity requests an adaptive retransmission, the HARQ process shall store the uplink grant received from the HARQ entity, set CURRENT_IRV to the index corresponding to the redundancy version value provided in the HARQ information, set HARQ_FEEDBACK to NACK, and generate a transmission as described below. Else if the HARQ entity requests a non-adaptive retransmission, if HARQ_FEEDBACK=NACK, the HARQ process shall generate a transmission as described below.

To generate a transmission, the HARQ process shall instruct the physical layer to generate a transmission according to the stored uplink grant with the redundancy version corresponding to the CURRENT_IRV value, and increment CURRENT_IRV by 1 if the MAC PDU was obtained from the Msg3 buffer; or if there is no measurement gap at the time of the transmission and, in case of retransmission, the retransmission does not collide with a transmission for a MAC PDU obtained from the Msg3 buffer in this TTI.

If there is a measurement gap at the time of the HARQ feedback reception for this transmission and if the MAC PDU was not obtained from the Msg3 buffer, the HARQ process shall set HARQ_FEEDBACK to ACK at the time of the HARQ feedback reception for this transmission.

After performing above actions, the HARQ process then shall flush the HARQ buffer if CURRENT_TX_NB=maximum number of transmissions−1.

In LTE, in order to transmit uplink data, the UE has to get uplink grant from the eNB. For efficient uplink resource scheduling, the UE has to report the amount of data in the buffer and the eNB provides uplink grant based on the reported buffer size. This procedure ensures that a dedicated uplink resource is given to a UE so that collision between the UEs can be avoided. However, the UE has to wait for a while in order to transmit uplink data since the data becomes available for transmission. Moreover, in case there is no uplink resource to report buffer size, the UE would start SR or RA procedure, which brings additional delay in uplink transmission.

In DL transmission, when the eNB transmits DL data, e.g., TCP, to the UE, the eNB is likely to expect to receive the corresponding UL data, e.g., TCP ACK/NACK, from the UE. Although the exact timing when the UE will transmit the UL data is not known by the eNB, the eNB can learn or expect roughly when the UE will transmit the UL data corresponding to the DL data to the eNB from history. Then, the eNB may be able/want to pre-allocate the uplink resource for the expected UL data transmission in order to reduce the latency.

However, due to synchronous UL HARQ process, when the UE receives uplink grant from the eNB on a subframe N, the UE transmits uplink data on a subframe N+k by using the HARQ process corresponding to that subframe, e.g., k is 4 for FDD. In other words, upon reception of uplink grant, the UE has to perform UL transmission by using a specific HARQ process associated with a specific subframe, where the specific subframe is mapped to the reception timing of the uplink grant.

Since the UL data corresponding to the DL data is not exactly known when to occur, a new mechanism is needed for: i) from UE side, reporting buffer size for uplink resource request prior to when the UL data becomes available for transmission; an ii) from eNB side, providing uplink grant for at least one subframe to be used for UL transmission which could occur in the near future, where the exact timing cannot be known.

Figure 11:
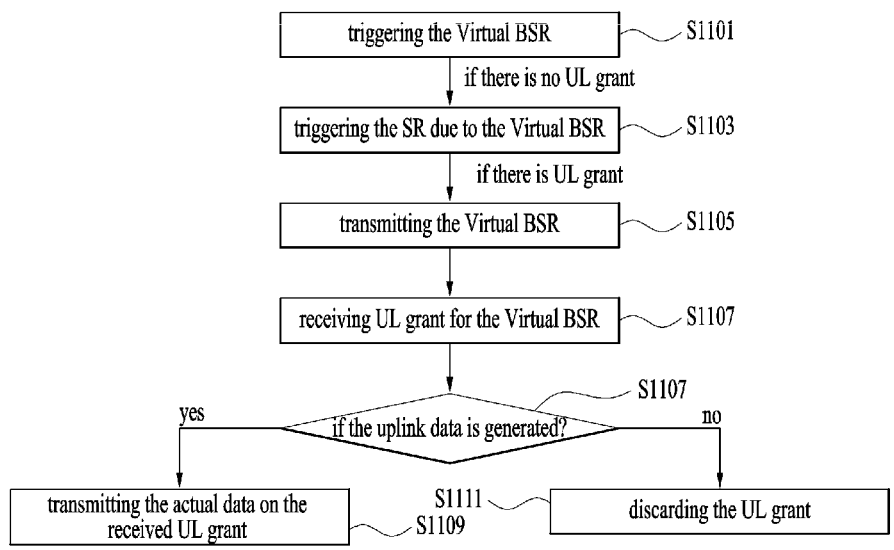
FIG. 11 is a conceptual diagram for triggering a buffer status reporting in a wireless communication system according to embodiments of the present invention.

FIG. 11 is a conceptual diagram for triggering a buffer status reporting in a wireless communication system according to embodiments of the present invention.

For the fast acquisition of UL grant, it is invented that even without any UL data to be transmitted, the UE sends Buffer Status Report (BSR) to the eNB to request UL grant for the transmission of UL data that is expected.

Preferably, the uplink data that is expected to be generated by the UE within a certain time period is called as "Virtual Data", and the BSR requesting UL grant for Virtual Data is called as "Virtual BSR".

In detail, when the UE expects that there is uplink data to be generated within a certain time period even though there is currently no uplink data available for transmission, the UE can trigger the Virtual BSR (S1101).

The UE can expect UL Virtual Data based on the received DL packets. For example, when the UE receives PDCP PDUs including TCP packets, the UE can expect that there will be a TCP ACK packet that needs to be transmitted in UL in a near future.

In detail, if a PDCP entity of the UE indicates that there will be a virtual data in near future to the MAC entity, the MAC entity triggers the virtual BSR for the virtual data.

The UE can also expect UL Virtual Data if there is a protocol periodically generating UL data. For example, the Robust Header Compression (ROHC) protocol in the UE PDCP may generate ROHC Initialization and Refresh (IR) packets periodically, which can be expected by the UE.

To trigger the Virtual BSR, the UE may generate Virtual Data in PDCP or RLC or MAC entity. The eNB may configure the UE that the UE triggers a BSR for TCP ACK packet at every Nth reception of TCP packets.

When a Virtual BSR is triggered, the UE triggers Scheduling Request (SR) if there is no UL grant (S1103). The SR may include the indication that the SR is triggered by the Virtual BSR.

When a Virtual BSR is triggered, the UE transmits the Virtual BSR if there is UL grant (S1105).

The Virtual BSR includes the size of the Virtual Data.

The Virtual BSR may include an indication that the BSR reports the size of Virtual Data, or an indication that the triggered BSR is for the virtual data.

When the eNB receives a BSR or SR for transmission of Virtual Data from the UE, the eNB allocate UL grant to the UE (S1107).

The UL grant for Virtual Data may include: i) an indication that this UL grant is for Virtual Data, ii) time duration during which the UL grant for Virtual Data is valid, or iii) a HARQ process ID which the UE uses for transmission by using this UL grant.

When the UE gets the UL grant for Virtual Data from the eNB (S1107), the UE stores the UL grant until the actual data is generated. The UE transmits the actual data on the received UL grant when the actual data is generated (S1109).

If actual data is not generated, the UE discards the UL grant for Virtual Data or transmits a Virtual BSR on the UL grant (S1111).

The time duration during which the UL grant for Virtual Data is valid may be configured by the eNB using RRC signaling or fixed in the specification. And also the time duration is included in the UL grant when the UL grant is received from the eNB.

Figure 12:
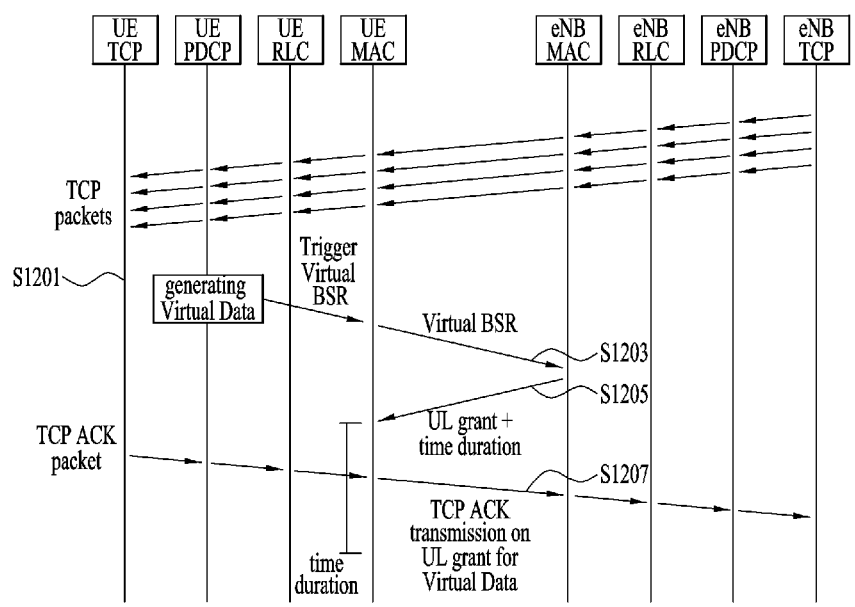
FIG. 12 is an example for triggering a buffer status reporting in a wireless communication system according to embodiments of the present invention.

FIG. 12 is an example for triggering a buffer status reporting in a wireless communication system according to embodiments of the present invention.

We are going to look into details on UL grants for the transmission of data which is roughly predictable when it becomes available for transmission, e.g., TCP ACK.

When the UE receives PDCP PDUs including TCP packets (S1201), the UE can expect that there will be a TCP ACK packet that needs to be transmitted in UL in a near future.

In this case, the UE can trigger and transmits the virtual BSR (S1203). When the UE receives uplink grant for the virtual BSR with a time duration (S1205), if the UE can generates an actual data (i.e. TCP ACK) with the time duration, the UE can transmits the TCP ACK using the uplink grant for the virtual data (S1207). If actual data is not generated, the UE discards the UL grant for Virtual Data or transmits a Virtual BSR on the UL grant.

Figure 13:
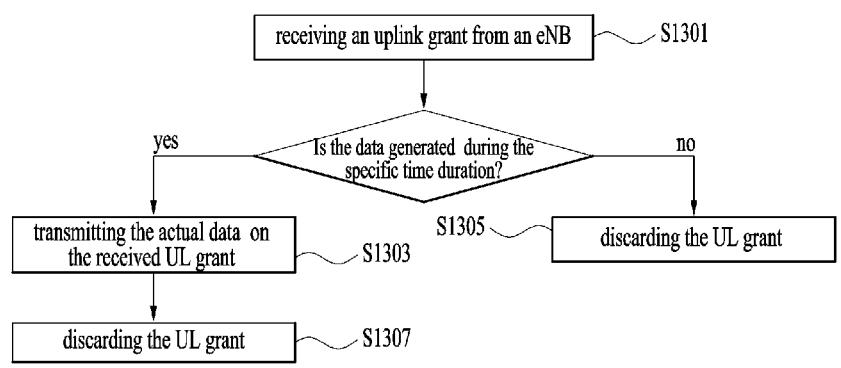
FIGS. 13 and 14 are conceptual diagrams for configuring uplink grants over multiple subframes in a wireless communication system according to embodiments of the present invention.

FIG. 13 is a conceptual diagram for configuring uplink grants over multiple subframes in a wireless communication system according to embodiments of the present invention.

In the Study Item "Study on Latency reduction techniques for LTE", TCP throughput improvement is one of the expected result of protocol enhancement for latency reduction. For TCP throughput improvement, it is quite obvious that providing uplink grant quickly, even with zero delay by pre-scheduling, is beneficial.

To achieve the pre-scheduling, there would be two methods: i) the eNB configures SPS UL grants with 1 ms of interval (Method 1), and ii) the eNB provides multiple UL grants for multiple subframes without receiving BSR from the UE (Method 2).

In method 1, the UE receives SPS configuration from the eNB, initializes (activates) SPS UL grants upon receiving PDCCH addressed by SPS C-RNTI, and skips uplink transmission if there is no data available for transmission in RLC/PDCP entities.

Method 1 can provides that the UE can use the configured SPS UL grant until it is released without any additional signaling once SPS UL grant is configured and initialized (activated). However, the UE can utilize the SPS UL grants only through multiple steps, i.e., the eNB provides SPS configuration and then initializing (activating) SPS UL grants. Therefore, even in case the SPS UL grants needs to be initialized as soon as it is configured, the eNB needs to perform the separate steps. This would delay in using SPS UL grants. And the UE can be configured with only one SPS configuration, i.e., one interval. As VoIP traffic and TCP ACK are different in their characteristic, it would be inefficient to serve VoIP traffic and TCP ACK with one SPS configuration. Therefore, the eNB may need to frequently configure/release SPS UL grants according to the expected traffic.

In method 2, the eNB predicts the UL data transmission without receiving BSR from the UE, and provides multiple UL grants for multiple subframes where the UE may transmit UL data. When the UE receives a PDCCH containing UL grant, the UE skips uplink transmission if there is no data available for transmission in RLC/PDCP entities.

In this case, there is no additional steps to use the UL grants as in SPS UL grants, i.e., configuration/initialization, and Scheduling flexibility can be dynamically achieved depending on the TCP ACK predictability, cell load, etc. However, if the eNB wants to provide dynamic UL grants for multiple subframes due to, e.g., unpredictability of UL data, the eNB should transmit PDCCH multiple times. It naturally increases signaling overhead.

Above two methods are already supported and can be used with a small change in the specification. However, as addressed in the above, both methods are not so efficient in terms of signaling overhead (method 1 and method 2) and delay in using the UL grants (method 1).

Based on the problem, there is a need to introduce a long-duration UL grant which is valid and can be used for configured multiple subframes.

The intention is to avoid transmitting multiple PDCCHs for multiple UL grants. This can be realized by providing the time period (multiple subframes) during which the UL grant is valid. The benefit would be the reduced signaling overhead especially for the data which could only be roughly predictable when it becomes available for transmission, e.g., TCK ACK.

Given that latency reduction for TCK ACK would result in throughput improvement of TCP, which is one of the dominating use case of internet, it seems to be worth discussing enhancement of dynamic UL grant. Moreover, this would require only a reasonable change in the specification, i.e., the eNB provides the time period during which the UL grant is valid by taking e.g., predictability of data occurrence or scheduling policy, into account.

The eNB transmits an UL grant valid for a specific time duration to the UE, the UE considers that the UL grant is valid during the specific time duration (S1301). So, the UE stores the UL grant until the actual data is generated.

If the actual data is generated during the specific time duration, the UE can transmit the data using the uplink grant (S1303). And if the actual data is not generated until the specific time duration is passed, the UE can discard the uplink grant (S1305) or transmits a Virtual BSR on the UL grant.

Preferably, the specific time duration is configured by the eNB using RRC signaling, or pre-configured, or is received with the uplink grant.

Preferably, the uplink grant is for a data which the UE expects to be generated (i.e., virtual data), and the uplink grant includes an indication that the uplink grant is for a data which the UE expects to be generated.

Preferably, the UL grant for Virtual Data may include i) an indication that this UL grant is for Virtual Data, ii) time duration during which the UL grant for Virtual Data is valid, or iii) a HARQ process ID which the UE uses for transmission by using this UL grant.

Preferably, when the UE expects that there is uplink data to be generated within a specific time duration even though there is currently no uplink data available for transmission, the UE can trigger the Virtual BSR.

If the UE transmits the data using the UL grant during the specific time duration although the specific time duration is not passed, the UE can discard the uplink grant (S1307).

Preferably, the specific time duration comprise two or more subframes.

Figure 14:
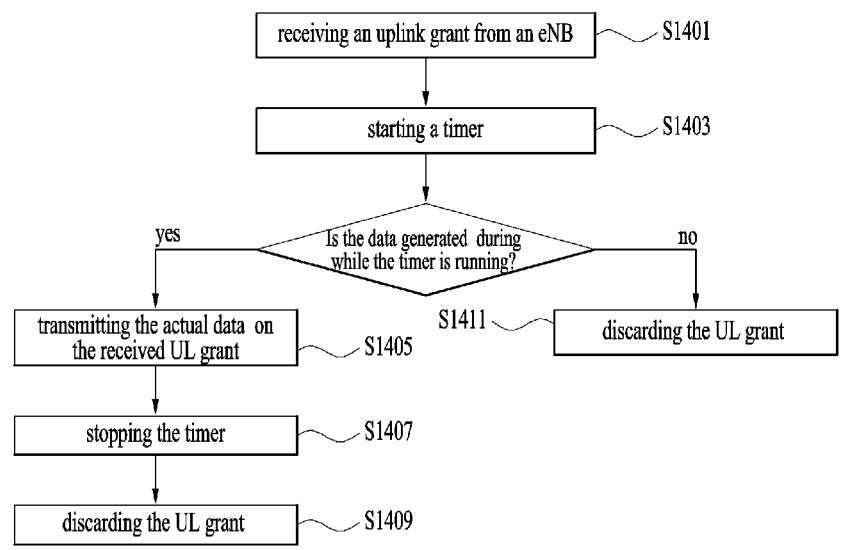

FIG. 14 is a conceptual diagram for configuring uplink grants over multiple subframes in a wireless communication system according to embodiments of the present invention.

The UE may maintain a timer for counting the specific time duration for which the uplink grant is valid.

When the UE receives the UL grant (S1401), the UE starts the timer TimerV (S1403). The UE considers that the VUL grant is valid while the TimerV is running, so the UE stores the UL grant until the actual data is generated. Preferably, a value of timer is configured by the eNB using RRC signaling, or pre-configured, or is received with the uplink grant, and the value of the timer is equal to or larger than two subframes.

While the TimerV is running, if UL data becomes available for transmission, the UE transmits the UL data using the UL grant (S1405). The UE uses a HARQ process that is mapped to the subframe where the UL transmission is performed on the UL grant.

And the UE stops the timer when the actual data is transmitted on the UL grant (S1407), in this case, the UE can discard the UL grant after the UE transmits the data using the uplink grant while the timer is running although the timer has not expired (S1409). While the TimerV is running, if no UL data becomes available for transmission, the UE discards the VUL grant after the TimerV expires (S1411) or transmits a Virtual BSR on the UL grant.

Preferably, the UL grant is for a data which the UE expects to be generated (i.e., virtual data), and the uplink grant includes an indication that the uplink grant is for a data which the UE expects to be generated.

Preferably, the UL grant for Virtual Data may include i) an indication that this UL grant is for Virtual Data, ii) time duration during which the UL grant for Virtual Data is valid, or iii) a HARQ process ID which the UE uses for transmission by using this UL grant.

Preferably, when the UE expects that there is uplink data to be generated within a specific time duration even though there is currently no uplink data available for transmission, the UE can trigger the Virtual BSR. The UE may maintain the timer for counting the time duration. The UE starts the timer when the UL grant for Virtual Data is received, and stops the timer when the actual data is transmitted on the UL grant. If the timer expires, the UE discards the UL grant for Virtual Data or transmits a Virtual BSR on the UL grant.

Figure 15:
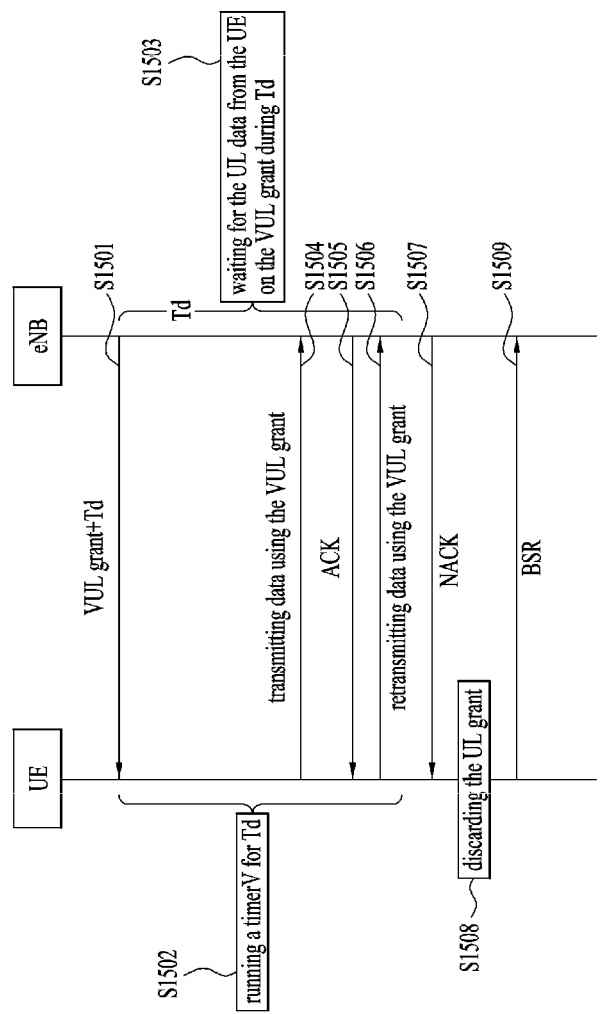
FIGS. 15 and 16 are conceptual diagrams for performing an ACK/NACK indication based on the uplink grants over multiple subframes in a wireless communication system according to embodiments of the present invention.
Figure 16:
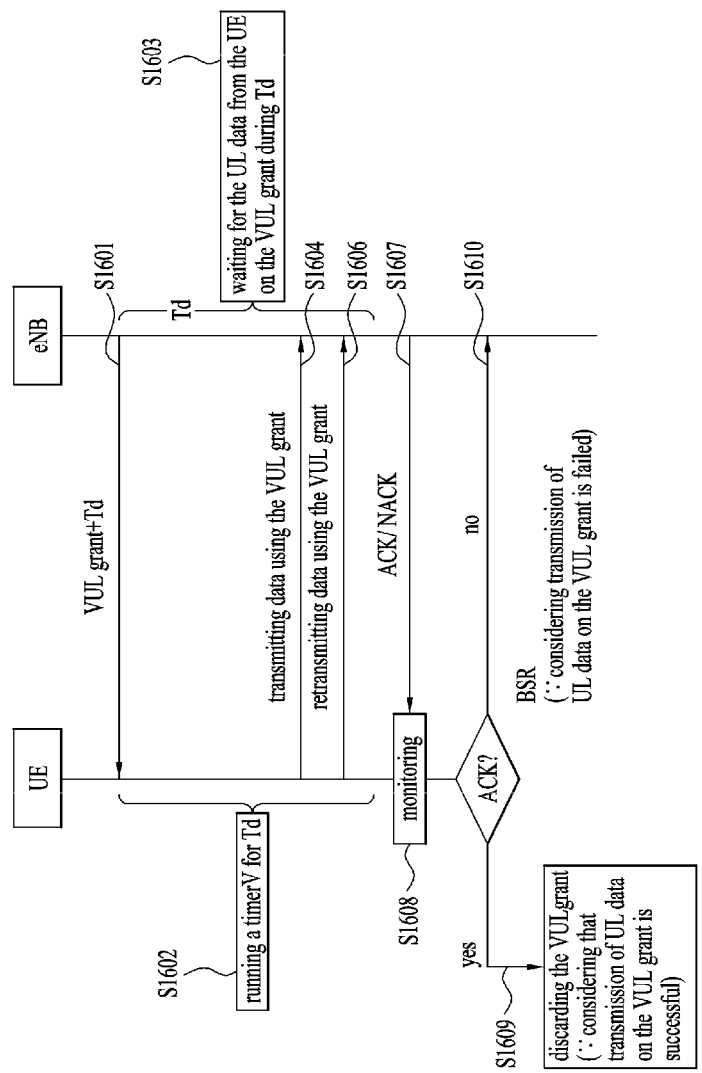

FIGS. 15 and 16 are conceptual diagrams for performing an ACK/NACK indication based on the uplink grants over multiple subframes in a wireless communication system according to embodiments of the present invention.

Let's call "UL grant+time duration" as "VUL grant", and "time duration" as "Td". The timer to count Td is called "TimerV".

In FIG. 15, when the eNB gives VUL grant to the UE (S1501), the UE starts the timer TimerV (S1502) and the eNB waits for the UL data from the UE on the VUL grant during the time duration Td (S1503).

The UE receives the VUL grant from the eNB, the UE considers that the VUL grant is valid during Td.

Preferably, a value of Td is configured by the eNB using RRC signaling, or pre-configured, or is received with the uplink grant, and the value of the timer is equal to or larger than two subframes.

Preferably, the VUL grant is for a data which the UE expects to be generated, and the VUL grant includes an indication that the uplink grant is for a data which the UE expects to be generated. Preferably, the value of Td is equal to or larger than two subframes.

While the TimerV is running, after transmitting UL data on VUL grant (S1504), the UE monitors an ACK indication or a NACK indication for the transmitted data on a subframe to wait for receiving the feedback from the eNB The eNB transmits ACK to the UE immediately, and releases the VUL grant from the UE (S1505).

The UE checks whether the TimerV is running or not if the ACK indication for the transmitted data is not received on the subframe or the NACK indication for the transmitted data is received on the subframe.

While the TimerV is running, if the UE does not receive ACK for the performed transmission or receive NACK indication, the UE may retransmit the UL data either in RLC entity or in MAC entity using the same VUL grant (S1506).

Else, if the eNB does not receive any UL data on VUL grant during Td, the eNB transmits NACK to the UE after Td is passed (S1507).

If the UE does not receive ACK until the TimerV expires, the UE discards the UL grant (S1508), keeps the UL data in RLC entity or in MAC entity, and triggers BSR to request UL grant for the UL data (S1508).

In FIG. 16, when the eNB gives VUL grant to the UE (S1601), the UE starts the timer TimerV (S1602) and the eNB waits for the UL data from the UE on the VUL grant during the time duration Td (S1603).

The UE receives the VUL grant from the eNB, the UE considers that the VUL grant is valid during Td.

Preferably, a value of Td is configured by the eNB using RRC signaling, or pre-configured, or is received with the uplink grant, and the value of the timer is equal to or larger than two subframes.

Preferably, the VUL grant is for a data which the UE expects to be generated, and the VUL grant includes an indication that the uplink grant is for a data which the UE expects to be generated. Preferably, the value of Td is equal to or larger than two subframes. While the TimerV is running, after transmitting UL data on VUL grant (S1604), the UE keeps the UL data in RLC entity or in MAC entity. The UE may retransmit the UL data either in RLC entity or in MAC entity using the same VUL grant while the TimerV is running (S1606).

The eNB transmits ACK if UL data is received on VUL grant during Td, or NACK if UL data has not been received on VUL grant during Td, to the UE after the Td (S1607).

According to the eNB' behavior, when the TimerV expires, the UE monitors feedback from the eNB. The feedback is for the UL transmission performed using the VUL grant (S1608). For which subframe(s) the UE monitors the feedback for the VUL grant is configured by the eNB.

If ACK is received, the UE considers that the UL data on the VUL grant has been successfully transmitted, and discards the UL data (S1609). Otherwise, if NACK is received or ACK is not received, the UE considers that the transmission of UL data on the VUL grant is failed, and triggers BSR to request UL grant for the UL data (S1610).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a User Equipment (UE) operating in a wireless communication system, the method comprising:
   triggering a first buffer status reporting (BSR) by generating virtual data, when the UE expects that there is data to be generated;
   transmitting the triggered BSR;
   receiving an uplink grant in response to the transmitted BSR;
   starting a timer when the uplink grant is received from a Base Station (BS), wherein the uplink grant is valid while the timer is running;
   when actual data is generated while the timer is running:
   transmitting the actual data on the uplink grant;
   monitoring an Acknowledgement (ACK) indication and a Negative-Acknowledgement (NACK) indication for the actual data on a subframe;
   determining whether the timer is running or not when the ACK indication for the actual data is not received on the subframe or the NACK indication for the actual data is received on the subframe;
   retransmitting the actual data on the uplink grant based on a determination that the timer is running; and
   discarding the uplink grant and keeping the actual data based on a determination that the timer is not running; and
   when the actual data is not generated while the timer is running:
   discarding the uplink grant.

2. The method according to claim 1, wherein further comprising:

triggering a second BSR when the uplink grant is discarded.

3. The method according to claim 1, wherein a value of the timer is configured by the BS via Radio Resource Control (RRC) signaling, or is pre-configured, or is received with the uplink grant.

4. The method according to claim 3, wherein the value of the timer is equal to or larger than two subframes.

5. A User Equipment (UE) for operating in a wireless communication system, the UE comprising:
   a Radio Frequency (RF) module; and
   a processor operably coupled with the RF module and configured to:
   trigger a first buffer status reporting (BSR) by generating virtual data, when the UE expects that there is data to be generated;
   transmit the triggered BSR;
   receive an uplink grant in response to the transmitted BSR;
   start a timer when the uplink grant is received from a Base Station (BS), wherein the uplink grant is valid while the timer is running;
   when actual data is generated while the timer is running:
   transmit the actual data on the uplink grant;
   monitor an Acknowledgement (ACK) indication and a Negative-Acknowledgement (NACK) indication for the transmitted data on a subframe;
   determine whether the timer is running or not when the ACK indication for the actual data is not received on the subframe or the NACK indication for the actual data is received on the subframe;
   retransmit the actual data on the uplink grant based on a determination that the timer is running; and
   discard the uplink grant and keep the actual data based on a determination that the timer is not running; and
   when the actual data is not generated while the timer is running:
   discarding the uplink grant.

6. The UE according to claim 5, wherein the processor is further configured to:
   trigger a second buffer status reporting (BSR) when the uplink grant is discarded.

7. The UE according to claim 5, wherein a value of the timer is configured by the BS via Radio Resource Control (RRC) signaling, or is pre-configured, or is received with the uplink grant.

8. The UE according to claim 7, wherein the value of the timer is equal to or larger than two subframes.

* * * * *